United States Patent [19]

Grimes et al.

[11] Patent Number: 4,781,825
[45] Date of Patent: Nov. 1, 1988

[54] FILTER WITH SELF-ACTUATING ROTATING BACKWASH SELECTOR

[75] Inventors: Steven D. Grimes, LaPlace, La.; Sidney H. DePriest, Ponca City, Okla.

[73] Assignee: Conoco Inc., Ponca City, Okla.

[21] Appl. No.: 133,095

[22] Filed: Dec. 14, 1987

[51] Int. Cl.⁴ ................... B01D 29/24; B01D 29/38
[52] U.S. Cl. ................... 210/107; 210/108; 210/323.2; 210/333.1; 55/284; 55/302
[58] Field of Search ........... 210/107, 108, 323.2, 210/333.1, 355, 333.01; 55/284, 285, 302

[56] References Cited

U.S. PATENT DOCUMENTS

| | | | |
|---|---|---|---|
| 950,118 | 2/1910 | Rood | 210/107 |
| 1,591,229 | 7/1926 | Oliver et al. | 210/333.1 |
| 2,954,873 | 10/1960 | Davis | 210/333.1 |
| 3,168,469 | 2/1965 | Abdalian et al. | 210/333.1 |
| 3,169,109 | 2/1965 | Hirs | 210/333.1 |
| 3,176,846 | 4/1965 | Adams | 210/333.1 |
| 3,228,528 | 1/1966 | Mummert et al. | 210/333.1 |
| 3,275,148 | 9/1966 | Vicino | 210/355 |
| 3,356,215 | 12/1967 | Miles, Jr. | 210/108 |
| 3,703,465 | 11/1972 | Reece et al. | 210/333.1 |
| 3,713,538 | 1/1973 | Kass | 210/333.1 |
| 3,762,648 | 10/1973 | Deines et al. | 239/383 |
| 4,190,207 | 2/1980 | Fienhold et al. | 239/381 |
| 4,415,448 | 11/1983 | Lennartz et al. | 210/333.1 |
| 4,486,304 | 12/1984 | Neuman et al. | 210/107 |
| 4,565,631 | 1/1986 | Bitzer et al. | 210/333.1 |

Primary Examiner—Ernest G. Therkorn
Assistant Examiner—Linda S. Evans

[57] ABSTRACT

A filter comprising a housing having a plurality of filter tubes suspended from a partition which divides the housing into an upper and lower chamber and a backwash selector which is rotated by backwash fluid so that during the backwash mode filter tubes are sequentially exposed to the full force of the backwash fluid so that an improvement in backwashing is obtained. The use of the filter is also disclosed.

7 Claims, 2 Drawing Sheets

FILTER WITH SELF-ACTUATING ROTATING BACKWASH SELECTOR

FIELD OF THE INVENTION

This invention relates to a filter assembly and in particular to an improved filter assembly including a plurality of tubular filter means and a self-actuating rotating backwash selector which causes said filter means to be backwashed in a sequential fashion so as to allow for more efficient backflushing with a given amount of backflush fluid.

BACKGROUND OF THE INVENTION

Among the filter assemblies commonly used for removing solid particles from a fluid are those having a plurality of tubular filter means suspended in a housing wherein the tubular filter means are closed at the bottom and open at the top. Some examples of such filter assemblies are disclosed in U.S. Pat. Nos. 2,954,873, 3,169,109, 3,228,528, and 3,356,215; the disclosures of which are incorporated herein by reference.

In those types of filter assemblies, the tubular filter means are suspended from a partition which divides the housing into a lower inlet portion and an upper outlet portion. The partition has openings in it which allow fluid to flow from inside the filter means to the upper outlet portion of the housing. Filtering is accomplished with those filter assemblies by introducing the solids-containing fluid into the lower inlet portion of the housing. The fluid flows through the walls of the tubular filter means and up into the upper outlet portion of the housing. The solids removed remain on the outside of the tubular filter means.

Such filter assemblies have found a wide range of uses, including, for example, the filtering of boiler feedwater, cooling water pharmaceutical process solutions, salt water, and refinery process streams, such as coker gas oil or heavy vacuum gas oil streams. In some applications a filter cake is applied to the outside of the tubular filter means.

Generally, in all applications of such filter assemblies at some point in time the accumulation of solids on the outside of the tubular filter means becomes so great that it is necessary to backflush the tubular filter means. The backflush generally involves flowing filtrate or other backflush fluid in a reverse fashion through the filter means while the filtering is shifted to another filter assembly.

It is desirable to be able to clean the filter means as quickly as possible with a minimum amount of backflush fluid. It has been observed that if one tries to backwash all the tubular filter means simultaneously, more backflush liquid is needed than is generally desirable.

An object of the present invention is thus to provide a means for backflushing a plurality of tubular filter means to obtain adequate cleaning of the filter means with smaller quantities of backflush fluid.

Still another object of the present invention is to provide a means for controlling the backflush that is less complex, more reliable, and more economical than many means of the prior art.

Other aspects, objects, and advantages of the present invention will be apparent from the following description taken in conjunction with the accompanying drawings.

SUMMARY OF THE INVENTION

In accordance with the present invention, there is provided a filter assembly comprising a container housing having a tube sheet partition which divides the housing into an upper and lower chamber. A plurality of tubular filter means which are open at the top and closed at the bottom are suspended from the partition. The partition contains openings which allow fluid flow between the upper chamber and the inside of each said filter means.

An inlet is provided in the lower chamber through which fluid that is to be filtered can be transferred from a source of supply. An outlet is provided in the upper chamber through which filtrate can be recovered. Above the partition there is a blockoff plate capable of resting on the partition and covering at least part of the openings in the partition which communicate with the filter means while at the same time allowing for each of said openings to be uncovered at least once as said plate is rotated around an axis.

A blockoff plate mounting means is provided in said upper chamber which allows the blockoff plate to be rotated and which allows the blockoff plate to move axially so that in the backwash mode said plate rests on said partition and in the filter mode said plate is lifted by the pressure of the filtrate to allow the filtrate to flow from all the filter means into the upper chamber.

A turbine means is secured to the upper surface of the blockoff plate and an inlet means is provided in the upper chamber, which inlet means is capable of directing fluid to said turbine means in such a fashion as to cause said blockoff plate to rotate.

DETAILED DESCRIPTION OF THE INVENTION

A further understanding of the invention and its advantages will be provided by referring to the Figures which illustrate one embodiment of the present invention.

Figure 1:
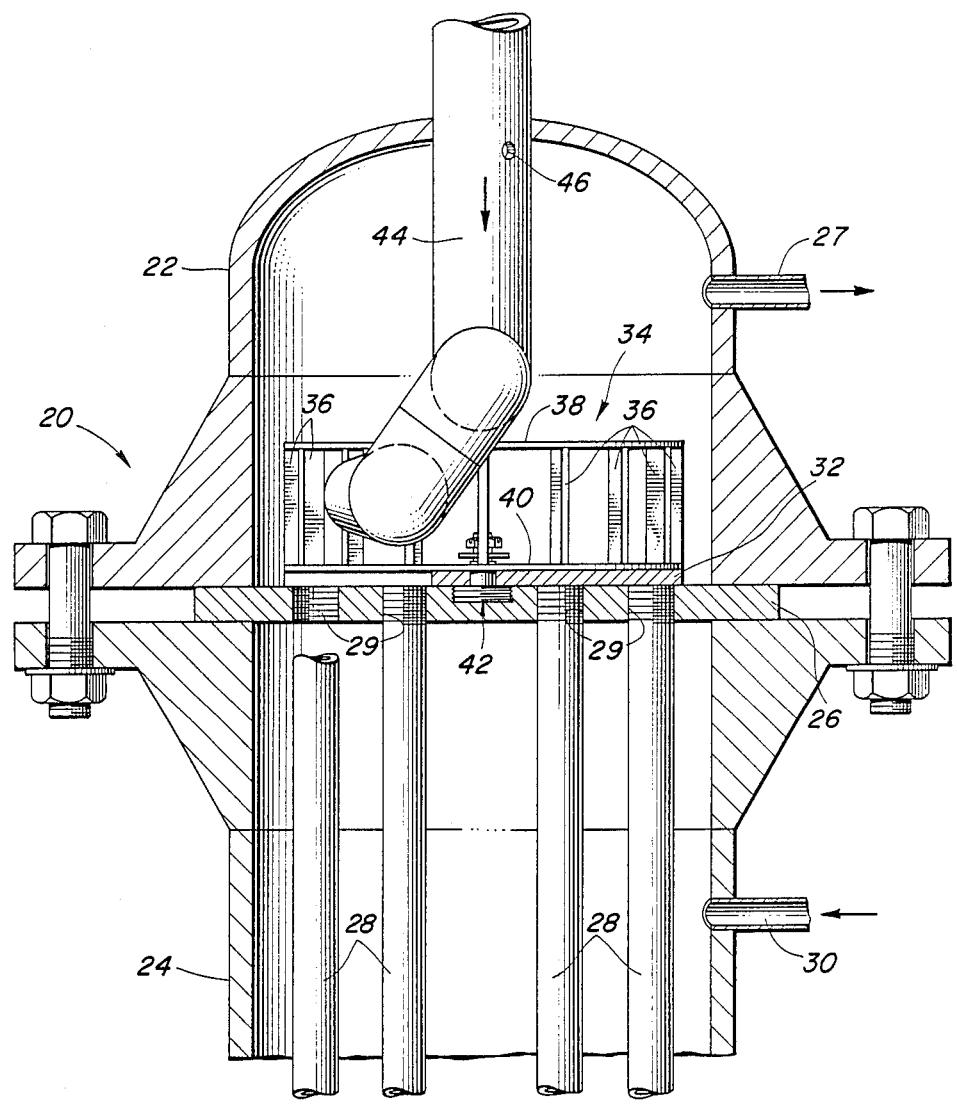
FIG. 1 is a cross-sectional side view of a top portion of a filter assembly incorporating a preferred embodiment of the present invention.

Referring in particular first to FIG. 1, there is shown a housing 20 comprising an upper dome portion 22 and a lower portion 24. The housing 20 is divided into an upper chamber and a lower chamber by the tube sheet partition 26. A plurality of tubular filter means 28 are suspended from the partition 26.

A typical example of suitable tubular filter means is the the 4 foot 6 inch long 2 and ⅜ inch outside diameter "Weld Wire" tubular filters or strainers currently sold by Croll-Reynolds Enginnering Co., Inc., of Trumbull, Conn., under the trademark "ClaRite".

The partition 26 has openings 29 extending through it. The filter means are secured in the openings by threaded portions corresponding to threads on the upper end of the filter means.

The upper dome portion 22 has an outlet 27 through which filtered fluid can be removed. The lower housing portion 24 has an inlet 30 through which the fluid that is to be filtered can be introduced into the container housing. It is noted that the exact location of the above-mentioned inlet and outlets in the respective chambers is not particularly critical so far as the present invention is concerned.

Above the partition 26 there is shown the blockoff plate 32. The blockoff plate 32 has a turbine means 34 comprising a ring of paddle wheels or blades 36 secured to its upper surface. In the illustrated, currently preferred, embodiment the paddle wheels are secured to upper and lower rings 38 and 40, the latter of which is secured to the blockoff plate 32.

The blockoff plate 32 is mounted to the partition 26 by a mounting means 42 which will be described in more detail later. An inlet means 44 comprising a conduit directs backflush fluid onto the blades of the paddlewheel turbine 34 during the backflush mode. The inlet means preferably contains a weep hole 46 near the upper end of the dome portion 22.

Figure 2:
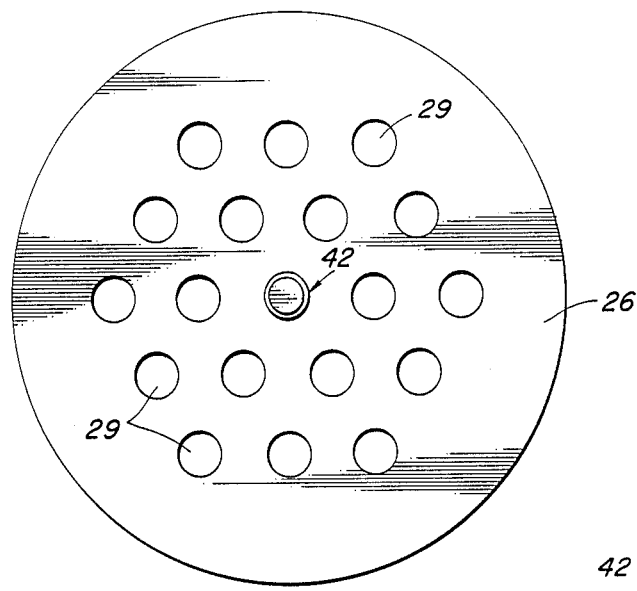
FIG. 2 is a top plane view of the tube sheet of FIG. 1.

FIG. 2 illustrates the tube sheet partition 26 with the blockoff plate mounting means 42 in place. This top view of the partition 26 shows the openings 29 for each of the plurality of tubular filter means.

Figure 3:
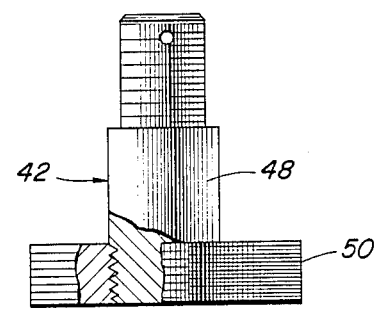
FIG. 3 is a partial cut-away side view of the center support post employed for attaching the inventive blockoff plate to the tube sheet portion of the assembly.
Figure 5:
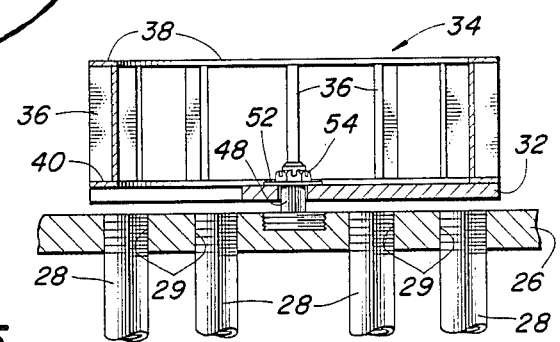
FIG. 5 is a cross-sectional diagrammatical side view illustrating the relative positions of the blockoff plate and the tube sheet portion when the filter assembly is in the filtering mode.

The mounting means 42 is illustrated in more detail in FIG. 3. It comprises a center support post 48 and a mounting shoulder 50. The mounting shoulder 50 is threaded so as to be capable of being screwed into a correspondingly threaded recess in the partition 26. The upper surface of the mounting shoulder is preferably flush with or below the upper surface of the partition 26. The center support post 48 in turn in threaded engagement with the mounting shoulder 50. The mid portion of the center support post is a smooth cylindrical portion slightly smaller in diameter than the central opening of the blockoff plate to allow the blockoff plate when mounted thereon to be free for axial and rotational movement. The upper end of the center support post is threaded. When the blockoff plate is mounted on the center support post as illustrated in FIGS. 1 and 5 a stop ring washer 52 is placed on the post over the blockoff plate and then a crown nut 54 is secured onto the threads. If desired, a cotter pin can be inserted through one of the slots in the crown nut and then through a hole present in the upper end of the threaded portion of the support post to insure that the crown nut will remain secure.

Figure 4:
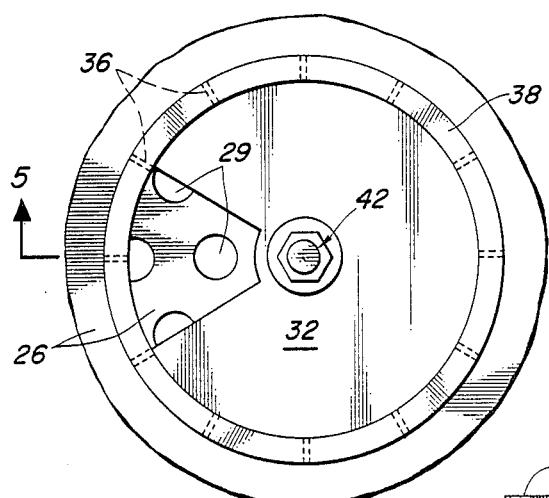
FIG. 4 is a top plane view of the block-off plate and its turbine actuating means resting above the tube sheet portion of the assembly.

FIG. 4 illustrates a top view of the blockoff plate 32 with its attached paddlewheel turbine means assembled upon the partition 26. In the backflush mode, the plate 32 will rest on the partition 26 as shown in FIG. 1 and will rotate as backwash fluid is introduced via the conduit 44. It will be noted that when backwashing with a limited amount of fluid according to the present invention, the limited fluid used is directed at a small area of the total filter at any given time, and when so directed is at a higher pressure, leading to a more complete backwash. The plate 32 thus blocks off the flow of backwash fluid to all the filter tubes except those located under the open sector of the blockoff plate at a given time. As the blockoff plate rotates different tubes are blocked and others are uncovered so that by the time the plate 32 has made a complete revolution all the tubular filter means will have been exposed to backwash fluid. The blocking off of a portion of the filter tubes allows the unblocked filter tubes to receive a more thorough cleaning than if all the tubes were exposed to the same amount of fluid at once. In a currently preferred embodiment, the open section or sector of the blockoff plate 32 is of such size that it can allow about 1/5th of the filter tubes to be uncovered at one time. With such an arrangement the amount of backwash fluid that is passed through each tube is believed to be about 5 times that which each would have received if the filter tubes had all been exposed at one time to the backwash fluid.

FIG. 5 demonstrates the position of the blockoff plate 32 relative to the partition 26 when the filter assembly is being used in the filter mode. In the filter mode solids-containing fluid is introduced under pressure into the lower chamber of the housing. The fluid passes from the outside to the inside of the filter tubes 28 to produce filtered fluid, i.e. filtrate. The filtrate flows through the openings 29 in the partition 26 and then into the upper chamber. During the filtering mode the pressure of the filtrate lifts the blockoff plate 32 so that the filtrate can flow freely into the upper chamber of the housing. The filtrate can then be recovered via outlet 27.

In view of the fact that the present invention employs only one moving part, namely the blockoff plate, and requires no outside mechanical operating devices, such as levers or motorized drivers, it is an efficient, reliable device that is a significant advance in the art.

While the present invention has been described above in some detail by referring to a particularly preferred embodiment, it should be clear that there are other and further modifications which will be obvious to those skilled in the art having had the benefit of this disclosure which may be made without departing from the spirit and scope of this invention and its equivalents.

An example of such a modification includes employing a blockoff plate having a plurality of opposed open sectors rather than just one of the type illustrated in the accompanying Figures. Another modification could involve using a plurality of openings or slots in the blockoff plate in place of the illustrated open sector. In such case, the openings or slots in the blockoff plate would preferably be positioned so as to assure that all the filter tubes would have been exposed to backwashing by the time the blockoff plate is rotated 360 degrees.

Also it is clearly within the scope of the present invention to employ devices which sense the differential pressure in the upper and lower chamber and automatically control the switching of the filter assembly from the filtering mode to the backflush mode in response to the pressure differential. Likewise, one could use two or more of the inventive filter assemblies connected in such a manner that the filtering is shifted from one filter assembly to another when the backflushing is instituted.

In the currently preferred mode of employing the invention, the backwash is accomplished by introducing a continuous flow of the backwash fluid through the conduit 44. It is also within the scope of the invention to intermittently interrupt the flow of the fluid in conduit 44 so that the blockoff plate is rotated in an intermittent fashion. It is also within the scope of the present invention to have an additional inlet for backwash fluid which inlet is not used in activating the rotation of the blockoff plate. It is also within the scope of the present invention to employ a plurality of inlets which are directed such as to drive the turbine of the blockoff plate.

While certain embodiments and details have been shown for the purpose of illustrating the present invention, it will be apparent to those skilled in this art that various changes and modifications may be made herein without departing from the spirit or scope of the invention.

What is claimed is:

1. A filter for removing solids from a fluid comprising a housing having a partition which divides said housing into an upper chamber and a lower chamber, a plurality of tubular filter means secured to the bottom of said partition, said tubular filter means being open at the top and closed at the bottom, means defining openings in the partition which allow for fluid to flow from the open end of each said filter means into said upper chamber, means for supplying fluid to be filtered to the lower chamber, means for recovering filtered fluid from the upper chamber, a blockoff plate positioned above said partition, said blockoff plate having at least one open area so that said plate is capable of covering and uncovering each of said openings at least once as said plate is rotated about an axis, blockoff plate mounting means located in said upper chamber which allow said plate to rotate and to move axially so that in the backwash mode said plate rests on said partition and in the filter mode said plate is lifted above said partition to allow filtrate to flow from all the filter means into the upper chamber, a turbine means secured to the upper surface of the blockoff plate, and a backwash inlet means for directing fluid to said turbine means in such a fashion as to cause said blockoff plate to rotate.

2. A filter in accordance with claim 1 wherein said blockoff plate is a circular plate having at least one sector cut out so as to be able to uncover a plurality of said filter means at once in the backflush mode.

3. A filter in accordance with claim 2 wherein said circular plate has only one cut out sector and that sector is capable of uncovering approximately 1/5th of the filter tubes at one time.

4. A filter in accordance with claim 2 wherein said turbine means comprises a circular paddlewheel having a plurality of spaced apart blades extending upwardly from said plate.

5. A filter according to claim 4 wherein said backwash inlet means comprises an inlet conduit which directs backwash fluid against the blades of said turbine means.

6. A filter according to claim 5 wherein said blockoff plate mounting means comprises a support post which is attached in a fixed relationship to said partition and which extends through an opening means in the central axis of said blockoff plate, said support post extending above said plate a distance sufficient to allow the desired amount of axial movement and being of a dimension such that the blockoff plate will be free for rotational movement, and a stop means attached to the upper end of said support post to limit the extent of axial movement of the blockoff plate.

7. A filter in accordance with claim 6 wherein said circular plate has only one cut out sector and that sector is capable of uncovering approximately 1/5th of the filter tubes at one time.

* * * * *